Feb. 9, 1926.
W. E. SMITH
1,572,325
PISTON
Filed Sept. 15, 1925    2 Sheets-Sheet 1
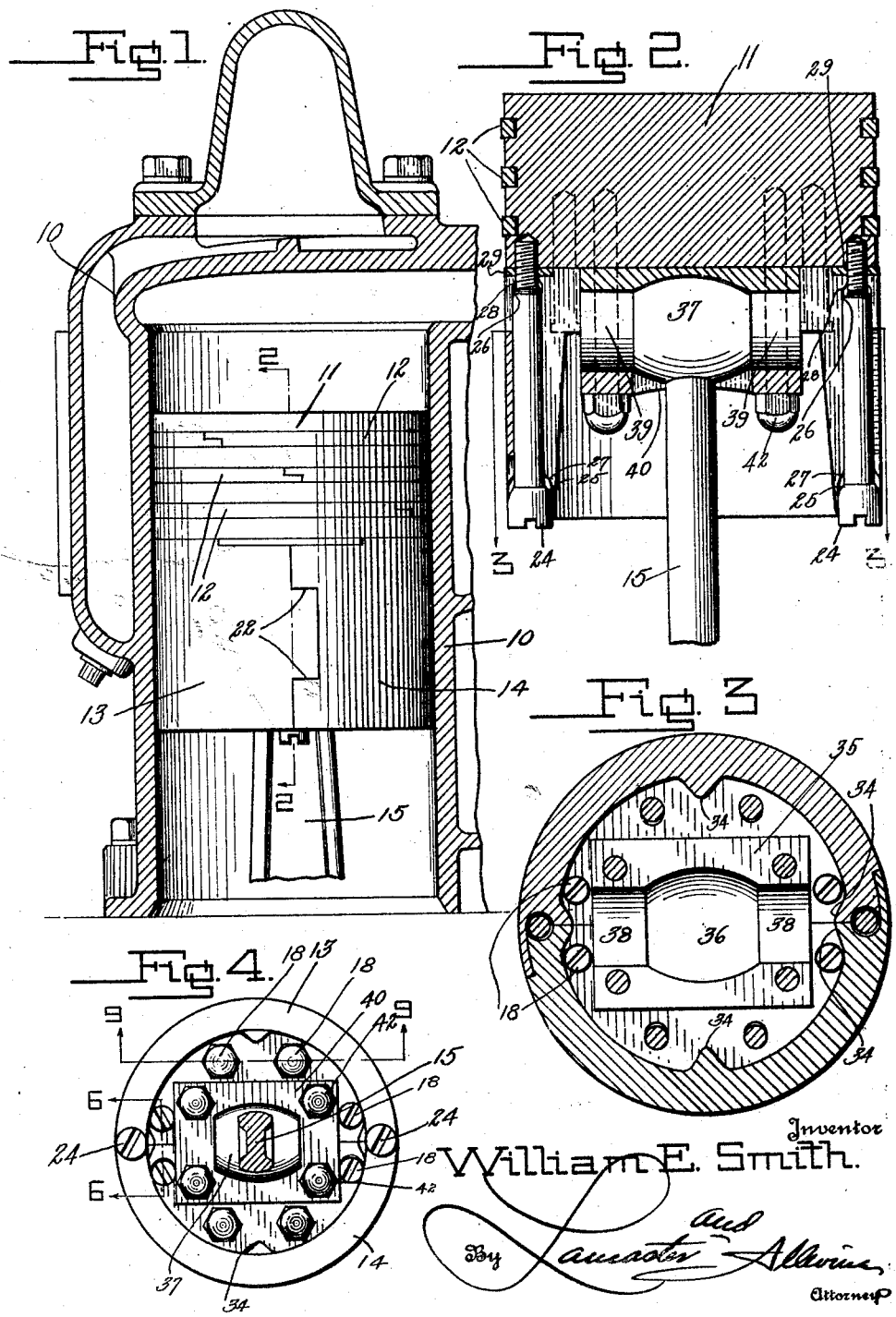
Inventor
William E. Smith.
By Lancaster and Allwine
Attorney Feb. 9, 1926.
W. E. SMITH
1,572,325
PISTON
Filed Sept. 15, 1925    2 Sheets-Sheet 2
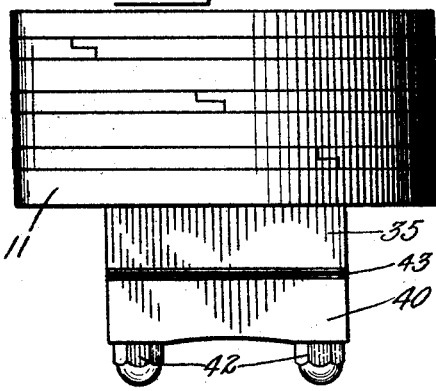
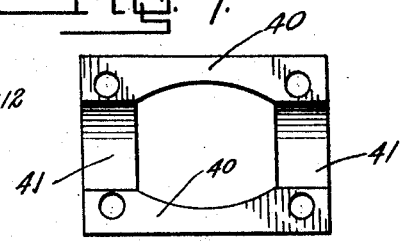
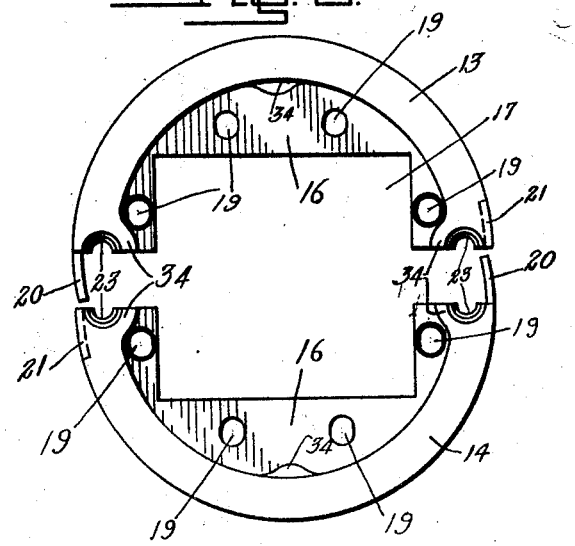
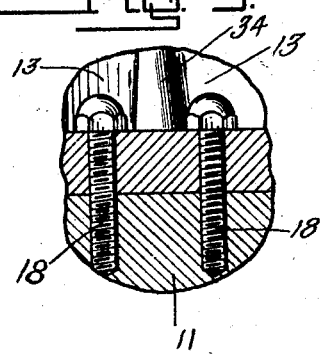
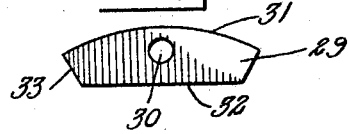
William E. Smith, Inventor Patented Feb. 9, 1926.

1,572,325

UNITED STATES PATENT OFFICE.

WILLIAM E. SMITH, OF JACKSON, MISSISSIPPI.

PISTON.

Application filed September 15, 1925. Serial No. 56,522.

*To all whom it may concern:*

Be it known that I, WILLIAM E. SMITH, a citizen of the United States, residing at Jackson, in the county of Hinds and State of Mississippi, have invented certain new and useful Improvements in Pistons, of which the following is a specification.

The present invention relates to internal combustion engines, and more particularly to the construction of pistons for use in the same.

An object of the present invention is to provide a piston which is capable of being expanded to approximately sixty-one-thousandth of an inch for taking up wear between the cylinder wall and the piston in lieu of discarding the worn piston and substituting a piston of larger size as is now the custom.

Another object of the invention is to provide a piston with an expansible skirt so connected to a piston head that the skirt may be expanded to take up wear without interfering with the head and piston rings and to provide a skirt which may be made relatively light and at the same time strong and durable.

The invention further aims to provide a novel connecting rod mounting in the piston for supporting the piston pin adjustably to take up wear between the same and its seat or support so that both the piston and the pin may from time to time be adjusted to compensate for wear so that the piston and the pin may last throughout the life of the motor.

The invention still further provides a piston head and a piston skirt with novel means for connecting the same rigidly together and which admits of the adjustment or expansion of the skirt without weakening the connection, the connection also serving to rigidly hold the skirt in its expanded position.

The above and various other objects and advantages of this invention will in part be described in and in part be understood from the following detailed description of the present preferred embodiment, the same being illustrated in the accompanying drawings, wherein;

Fig. 1 is a longitudinal vertical section through an engine cylinder showing in side elevation a piston constructed according to the present invention mounted therein.

Fig. 2 is an enlarged longitudinal section taken through the piston on the line 2—2 of Fig. 1.

Fig. 3 is a transverse section taken through the piston on the line 3—3 of Fig. 2.

Fig 4 is a bottom plan view of the piston with the connecting rod mounted therein, the latter being shown in section.

Fig. 5 is a detail side elevation of the piston head with the connecting rod bearing mounted thereon.

Fig. 6 is a fragmentary enlarged section taken through one side of the piston substantially on the line 6—6 of Fig. 4.

Fig. 7 is a detail inner face view of the bearing cap for the piston pin.

Fig. 8 is a detail bottom plan or end view of the piston skirt, showing the two halves separated.

Fig. 9 is an enlarged fragmentary section through one side of the piston substantially on the line 9—9 of Fig. 4, and Fig. 10 is a plan view of one of the filler plates employed between the head and skirt of the piston.

Referring to the drawings 10 designates the cylinder of an internal combustion engine of any suitable type and in which the improved piston may be mounted. The piston comprises a head 11 equipped with the usual compression rings 12 adapted to seal the head in the cylinder 10, and the head 11 carries a two part skirt 13 and 14 and is secured to the upper or outer end of a connecting rod 15.

The head 11 is preferably solid and of substantial thickness or length to carry the rings 12 and give the desired weight to the piston. The skirt comprises a pair of semi-cylindrical sections 13 and 14 which are provided at their upper ends with inwardly extending webs 16 partially closing the upper end of the skirt and adapted to engage flat against the lower side of the head 11. The webs 16 have an inner marginal configuration providing a substantially rectangular opening 17 through the top of the skirt for a purpose which will presently appear, and the ends of the webs 16 and the cylinder skirt sections 13 and 14 terminate in flat opposed faces adapted to be brought together when the skirt is assembled as shown in Fig. 3 to complete the cylindrical formation.

The skirt is secured to the head by a number of machine screws 18 or the like which pass through elongated openings 19 formed through the webs 16, the major axes of the openings 19 extending in the general direction of separation of the skirt sections 13 and 14 to admit of the expansion of the skirt by merely loosening the screws 18. In the present instance eight screws 18 are employed but any suitable number may be used depending upon the size and character of the piston, and the conditions of manufacture and use.

At their meeting ends, the skirt sections 13 and 14 are provided with overlapping tongues 20, one on one end of each skirt section, which slidably engage in depressions or seats 21 formed in the opposite ends of the skirt sections 13 and 14. From Fig. 1 in particular the tongues 20 may be relatively short and the seats 21 correspondingly formed so as to provide shoulders 22 for maintaining the skirt sections 13 and 14 against lengthwise displacement.

The meeting ends of the skirt sections 13 and 14 are also recessed as at 23 to provide bolt openings to receive expansion bolts 24, one between each pair of ends of the sections. From Fig. 2 it will be noted that each bolt 24 is provided with a tapering shoulder 25 at its inner end and a second tapering shoulder 26 near its outer end. The bolt openings 23 are similarly provided with cam surfaces 27 and 28 respectively at the lower and upper ends of the skirt to receive the shoulders 25 and 26 thereagainst when the screw 24 is turned upwardly for expanding the skirt sections 13 and 14 uniformly at the bottom and top of the skirt.

The free ends of the bolts 24 are threaded and engaged in threaded openings formed in the lower side of the head 11, the threaded portions of the bolts being of sufficient length to support the same and maintain the bolts in adjusted position. The screws 18 are depended upon to firmly hold the skirt to the head, and the elongated openings 19 admit of the adjustment of the skirt without requiring removal or displacement of the bolts 18.

For the purpose of closing and sealing the joint at the upper ends of the skirt sections 13 and 14, packing plates 29 are employed and may be constructed as shown in detail in Fig. 10 with an intermediate opening 30 for the reception of the upper threaded ends of the bolts 24, the outer marginal edges 31 of the plates 29 conforming to the general curvature of the meeting ends of the skirt sections. The inner edges 32 of the plates are preferably straight so as to lie within the marginal edge portions of the webs 16. The ends 33 of the plates 29 are preferably bevelled so as to remain out of contact with the adjacent screws or bolts 18.

The skirt sections 13 are reinforced at suitable points by enlargements 34 on their inner sides, such enlargements being preferably formed intermediate the ends of the skirt sections and also at the meeting ends thereof. The enlargements extend longitudinally of the skirt and reinforce and strengthen the same against cracking.

The piston is provided with a novel type of connecting rod bearing which comprises a bearing block 35 which has an upper flat face adapted to seat against the lower side of the piston head 11 and which is of a configuration to extend downwardly through the opening 17 in the top of the skirt. The block 35 is provided with an elongated central depression 36 adapted to receive the upper part of a ball head 37 carried upon the upper end of the connecting rod 15. At opposite ends of the depression 36, the block 35 is provided with cylindrical pin bearing surfaces 38 adapted to receive the upper side of a piston pin 39 at opposite ends. The pin 39 is carried through the head 37, and the pin and the head are held to the block 35 by a cap plate 40 which is secured against the lower side of the block 35. The cap plate 40 is provided with cylindrical bearing portions 41 at opposite ends adapted to engage the lower side of the pin 39 while the intermediate portion of the block 40 is recessed or open to leave free the lower side of the ball head 37, and to receive the connecting rod 15 therethrough.

Screw bolts 42 or the like are secured through the corner portions of the cap plate 40 and the block 35, and pass upwardly into the head 11 for securing the connecting rod bearing directly to the head and independently of the skirt. By this construction the skirt is relieved of all strain usually imposed upon the skirt by the piston pin and its bearings. A plurality of shims 43 are interposed between the opposite side portions of the block 35 and cap plate 40, and may be individually stripped off to take up wear which may occur between the piston pin 39 and its bearings 38 and 41.

The piston and connecting rod are operated in the usual manner, and after considerable wear has taken place between the cylinder and piston, and between the connecting rod and its bearing, instead of discarding the piston and piston pin for new ones of larger dimensions, the piston may be enlarged by loosening the bolts 18, turning up the expansion bolts 24 to spread the skirt sections 13 and 14, and again tightening the bolts 18. One or more shims 43 may be removed from between the block 35 and the cap plate 40 of the piston pin bearing to take up lost motion between the same. With these adjustments the piston and piston pin may again be used and similarly adjusted from time to time throughout the life of the engine.

It is of course understood that various changes and modifications may be made in the details of construction and design of the above specifically described embodiment of this invention without departing from the spirit thereof, such changes and modifications being restricted only by the scope of the following claims.

What is claimed is:

1. A piston comprising a head, a pair of skirt sections detachably mounted on the head, means for locking said skirt sections together against vertical movement at their abutting edges, and a pair of expanding bolts adapted to extend through said skirt sections at the abutting edges thereof.

2. A piston comprising a head, a pair of independent and detachable skirt sections carried by the head, each of said skirt sections having recesses in one edge intermediate the top and bottom thereof and a shoulder at the opposite edge, said shoulder of one section being adapted to seat in the recess of the other section for locking the sections against vertical movement, and a pair of expanding bolts adapted to extend through said skirt sections adjacent the abutting edges thereof.

3. A piston comprising a head, a pair of skirt sections independently and adjustably secured to the head, and a pair of expanding bolts carried by the head and engaging between the abutting ends of the skirt sections.

4. A piston comprising a head, a pair of skirt sections having inwardly extending webs at their upper ends, bolts extending through the webs and into the head for securing the webs thereto, and a pair of expanding bolts threaded in the head and lying between the abutting ends of the skirt sections for expanding the same.

5. A piston comprising a head, a pair of skirt sections having inwardly extending webs at their upper ends adapted to engage the lower side of the head and having openings therethrough elongated in the direction of separation of the sections, bolts engaging through the openings and secured in the head for binding the skirt sections thereto when adjusted, and expansion bolts extending upwardly between the abutting ends of the skirt sections and threaded in the head for advancing the bolts upwardly when turned, said bolts having inclined shoulders thereon and said skirt sections having cam surfaces engaging the shoulders of the bolts for expanding the skirt sections when the bolts are turned up.

6. A piston comprising a head, a pair of skirt sections, means for independently and adjustably securing the skirt sections to the head, expansion bolts extending between the adjacent ends of the skirt sections and threaded in the head, inclined shoulders on said bolts at the upper and lower ends thereof, and cams on the upper and lower edge portions of the skirt sections engaging said shoulders for uniformly expanding the upper and lower portions of the skirt when the bolts are turned.

7. A piston comprising a head, a skirt detachably secured to the lower side of the head and having an opening in its upper end, a bearing block engaging the lower side of the head and extending through said opening into the skirt, said block having a central depression and bearing surfaces at opposite ends of the depression, a connecting rod having a ball head adapted to seat in said depression, a piston pin carried through the ball head and engaging at opposite ends in said bearing surfaces of the block, a cap plate engaging against the lower side of the block having a central opening for said ball head and the connecting rod and provided with bearing portions at opposite ends to engage said pin and hold it to the block, and screw bolts extending upwardly through the cap plate and block and into the piston head for holding the block and cap plate thereto.

WILLIAM E. SMITH.